US012755524B2

(12) United States Patent
Millison

(10) Patent No.: US 12,755,524 B2
(45) Date of Patent: Oct. 6, 2026

(54) METHOD OF TRAINING MACHINE LEARNING MODEL FOR DETECTING TARGET OBJECT IN INFRARED IMAGE, METHOD EXECUTED BY PROCESSOR THEREFOR, ONBOARD VEHICLE COMPUTER UNIT THEREFOR, NON-TRANSITORY COMPUTER READABLE STORAGE MEDIUM COMPRISING PROGRAM CODES THEREFOR, VEHICLE

(71) Applicant: SUBARU CORPORATION, Tokyo (JP)

(72) Inventor: Evan Millison, VanBuren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 231 days.

(21) Appl. No.: 18/737,338

(22) Filed: Jun. 7, 2024

(65) Prior Publication Data

US 2025/0378685 A1 Dec. 11, 2025

(51) Int. Cl.

| | |
|---|---|
| ***G06K 9/00*** | (2022.01) |
| ***G06V 10/26*** | (2022.01) |
| ***G06V 10/70*** | (2022.01) |
| ***G06V 10/764*** | (2022.01) |
| ***G06V 20/58*** | (2022.01) |

(52) U.S. Cl.

CPC .............. *G06V 10/87* (2022.01); *G06V 10/26* (2022.01); *G06V 10/764* (2022.01); *G06V 20/58* (2022.01)

(58) Field of Classification Search

CPC ...... G06V 10/87; G06V 10/26; G06V 10/764; G06V 20/58; G06V 10/143; G06V 10/82; G06V 40/103

See application file for complete search history.

(56) References Cited

U.S. PATENT DOCUMENTS

| | | | | |
|---|---|---|---|---|
| 8,520,944 | B2 | 8/2013 | Cimbalista, Jr. | |
| 9,292,735 | B2 | 3/2016 | Nagaoka et al. | |
| 2016/0110614 | A1* | 4/2016 | Honda | G06V 40/103 382/103 |

FOREIGN PATENT DOCUMENTS

| | | | | |
|---|---|---|---|---|
| CN | 109815784 | A * | 5/2019 | |
| CN | 111767831 | A * | 10/2020 | G06F 18/24 |
| CN | 111914744 | A * | 11/2020 | G06F 18/214 |
| CN | 116091765 | A * | 5/2023 | G06V 10/26 |
| JP | 5760090 | B2 | 8/2015 | |

* cited by examiner

*Primary Examiner* — Xin Jia
(74) *Attorney, Agent, or Firm* — Rimon P.C.

(57) ABSTRACT

A method classifies an IR image to be used for training a machine learning model. The method comprises: (i) providing a set of machine learning models in function of temperature; (ii) acquiring an infrared image; (iii) identifying a target object to be detected and a comparison object in the infrared image; (iv) calculating a first characteristic of the target object in the infrared image and a second characteristic of the comparison object in the infrared image; and (v) based on the first characteristic of the target object and the second characteristic of the comparison object, selecting a machine learning model among the set of machine learning models in function of temperature for the IR image.

12 Claims, 8 Drawing Sheets

METHOD OF TRAINING MACHINE LEARNING MODEL FOR DETECTING TARGET OBJECT IN INFRARED IMAGE, METHOD EXECUTED BY PROCESSOR THEREFOR, ONBOARD VEHICLE COMPUTER UNIT THEREFOR, NON-TRANSITORY COMPUTER READABLE STORAGE MEDIUM COMPRISING PROGRAM CODES THEREFOR, VEHICLE

FIELD OF INVENTION

The present disclosure relates to methods of training a machine learning model for detecting a target object in an infra-red image.

BACKGROUND ART

Thermal imaging or infrared (IR) imaging methods have been employed for pedestrian detection, to be included in, or to support the advanced driver-assistance system (ADAS) and autonomous driving (AD). They perform well under low-light conditions such as during nighttime under which visible-range cameras or sensors cannot capture such objects.

IR cameras capture thermal energy or IR light emitted by each object in function of temperature, and thus have just one channel, i.e. provide images in a grey scale. Therefore, in IR images, a pedestrian appears brighter if the pedestrian is hotter than the surrounding objects such as in the winter, and darker if the surrounding objects are hotter than the pedestrian such as in the summer. Such a contrast inversion between the pedestrian and the surroundings depending on the weather conditions makes the pedestrian detection difficult or less accurate.

It is known that if the luminance of the image portion of the living body becomes lower than that of the background, for example when the outside air temperature is higher or by rainfall, it becomes difficult to extract the image portion of the living body, from a high luminance region. In such cases, the image contrast is inverted (PL1).

PRIOR ART LITERATURE

Patent Literature

Patent Literature 1: U.S. Pat. No. 9,292,735B (JP5760090B)

SUMMARY OF THE INVENTION

One general aspect of the present disclosure includes a method of classifying an infrared image to a machine-learning model among a provided set of machine learning models for detecting a target object in infrared images. The method may include:

(i) providing a set of machine learning models in function of temperature;

(ii) acquiring an infrared image;

(iii) identifying a target object to be detected and a comparison object in the infrared image;

(iv) calculating a first characteristic of the target object in the infrared image and a second characteristic of the comparison object in the infrared image;

(v) based on the first characteristic of the target object and the second characteristic of the comparison object, selecting a machine learning model among the set of machine learning models in function of temperature, and classifying the infrared image into training data to be used to train the selected machine learning model.

Another general aspect of the present disclosure includes a method to train a set of machine learning models using the classified infrared images to each of the machine learning models. The method may comprise training each of the set of machine learning models using infrared image classified to the each machine learning model as training data therefore.

Another aspect of the present disclosure includes a method of detecting a target object in an infrared image by using the set of machine learning models trained using classified infrared images.

Another aspect of the present disclosure includes a computer unit for detecting a target object in an infrared image by using the set of machine learning models trained using classified infrared images.

Another aspect of the present disclosure includes a vehicle including a computer unit for detecting a target object in an infrared image by using the set of machine learning models trained using classified infrared images.

For example, if an image contrast is inverted so that the target object and the background are always black and white, respectively, or vice versa, the training data set will have some images where the image contrast is large, and others where it is small. In this case, the system trained using such a training data set may not be able to detect the target objects if the temperature difference between the target objects and the background is small. In other words, if the system has only one model, it should be trained by a training data set including various data. As a result, the accuracy or quality of the target object detection is limited.

According to the present disclosure, a plurality of models are provided as a set, where each of the models has its own temperature range or its pixel contrast characteristics, and IR images are classified to the training data set for each model. Thus the models can therefore be trained by using the adapted training data. Therefore, even if the temperature difference between the target object and the background is small, the target object can be identified or recognized more accurately.

Infrared Image

An "infrared image" may be an image taken by using an IR camera, a thermal camera, an IR sensor, an IR image sensor, or the like, sensitive to infrared light. These terms are interchangeably used to describe a device or unit to capture IR images. Such an IR camera may be equipped with an IR passing filter that allows IR light to pass and blocks the visible light spectrum. The IR spectrum typically ranges from about 700 nm to about 1 mm in wavelength.

IR cameras usually have just one channel. In other words, each pixel of an IR image carries only intensity information represented by a number or a value, typically between 0 and 255, or a pixel depth of 256 intensities for 8-bit images. The value of a pixel, or a pixel value, is proportional to, or at least monotonically increases with, the light intensity of IR light captured by the pixel, corresponding to the temperature of the object in that pixel. Thus, the higher the temperature of the object is, the brighter (whiter) the pixel is, and the lower the temperature of the objects is, the darker (blacker) the pixel is.

Machine Learning Models in Function of Temperature

In some embodiments, a plurality or a set of machine learning models are provided. The set of machine learning models is defined in function of temperature or temperature range. In other words, each of the set of machine learning models may be defined by its own temperature range that is different from any other of the set of machine learning models.

In some embodiments, two machine learning models. For example, a "hot" model and a "cold" model may be provided. The "hot" model may be used if the temperature is above a threshold. The "cold" model may be used if the temperature is below the threshold.

In some embodiments, more than two machine learning models may be provided. For example, models $M_1$~$M_n$ may be provided, $M_1$ may be used if the temperature is above threshold $TH_{12}$. $M_2$ may be used if the temperature is below threshold $TH_{12}$ and above threshold $TH_{23}$. $M_1$ may be used if the temperature is below $TH_{i-1,i}$ and above threshold $TH_{i,i+1}$, and the like.

In some embodiments, each model is defined by its own temperature range which does not overlap with that of another model. In some embodiments, the temperature ranges defining models may be overlapped.

In some embodiments, the "temperature" and "temperature range" used to define the models may be a temperature of any object captured in the IR image or a temperature of the ambient/outside atmosphere or air. In some embodiments, the "temperature" and "temperature range" used to define the models may be a pixel value or a value related to the pixel values of a part or an entirety of the pixels in an IR image. For example, the "temperature range" of each model may defined by a range of pixel value or a range of a parameter or a function related to pixel values.

Target Object and Comparison Object

In some embodiments, the trained machine learning models will be used to detect and recognize a target object or a first object. In some embodiments, the target object may be a pedestrian. Pedestrian detection or sensing is important for further improving pedestrian safety of vehicles. Thus, in some embodiments, the trained machine learning models will be used in a vehicle or a car to detect pedestrians around a vehicle or in the driving direction of a vehicle.

In some embodiments, another object or a second object may be detected in an infrared image to be classified, used for training, or captured by a vehicle. The second object or a "comparison object" may be used to compare with the target object. In some embodiments, the comparison object may be a road surface. Examples of the comparison object is a road surface, and a part of the vehicle, for example the hood of the vehicle. Such objects are very commonly exist around a vehicle and can be easily captured by an IR camera installed in a vehicle.

The pedestrian's body temperature remains somewhat constant, and thus appears constantly in the same contrast in infrared images, aside from the effect of clothing. The road surface, typically made of asphalt, easily absorbs and liberates heat, and accordingly changes its temperature, depending on the ambient temperature. Therefore, in some embodiments, the target object is a pedestrian, and the comparison object is a road surface.

However it should not be interpreted that the present disclosure is limited to pedestrians as target object and road surfaces as comparison object. Other objects may be detected.

Identification of Target Object and Comparison Object

In some embodiments, the identifying of a target object and a comparison object includes using a sematic segmentation or "SemSeg" model. In some embodiments, the identifying of a target object and a comparison object includes using a 2D/3D model. In some embodiments, the identifying of a target object and a comparison object includes using a visible light image or a color image such as RGB image taken in the same angle of view or the same field of view as the infrared image. The target object and the comparison object may be identified in the visible light image by using a SemSeg model. The visible light image may be overlapped with the infrared image of the same field of view, to identify the target object and the comparison object in the infrared image. Thus, the pixels in the infrared image that correspond to the object (also referred to as "object pixels") can be determined.

Characteristics of Objects

In some embodiments, the calculating of a characteristic of an object in an infrared image may include calculating a value or information from the values of the pixels of the object in the infrared image. In some embodiments, a characteristic of an object may be a statistical value of the values of the object pixels. For example, an average of the pixel values of the object pixels may be calculated. An average of the pixel values of the target object pixels may be calculated. An average of the pixel values of the comparison object pixels may be calculated. Such a statistical value of the pixel values of the object pixels corresponds to the temperature of the object, for example an average temperature of the object or at least the part of the object that was visible from the camera.

Selection of a Machine Learning Model for the IR Image and Classification of the IR IMAGE In some embodiments, a machine learning model is selected for the acquired IR image. In some embodiments, the selecting of the machine learning model may include, or the method further include, determining a temperature relationship, based on the first characteristic of the target object in the infrared image and the second characteristic of the comparison object in the infrared image. The selecting of the machine learning model may be performed based on the determined temperature relationship.

In some embodiments, the determining of a temperature relationship includes comparing a statistical value of the pixel values of the target object pixels and a statistical value of the pixel values of the comparison object pixels. For example, the average of the pixel values of the target object pixels and the average of the pixel values of the comparison object pixels may be compared. If the pixel value average of the comparison object is greater (whiter) than the pixel value average of the target object, it is determined that the environment is hot, and thus that a "hot" model should be selected. If the pixel value average of the comparison object is smaller (blacker) than the pixel value average of the target object, it is determined that the environment is cold, and thus that a "cold" model should be selected.

The machine learning model for the IR image is selected such that the IR image is classified into training data that is used to train the selected machine learning model. In some embodiments, the selecting of the machine learning model may include classifying the infrared image into training data to be used to train the selected machine learning model.

The process or steps of IR image classification or machine learning model selection can be performed on a number of infrared images. As a result, a training data adapted specifically to the training of each of the machine learning models can be generated. Each of the machine learning models is trained using the training data including or consisting of the IR images that have been classified thereto.

Training of Machine Learning Models

Each of the set of machine learning models is trained using the training data set including the IR images that have been classified to the machine learning model. The machine learning model may be a supervised training model.

The type of machine learning models may be selected from any one of machine models suited to an image recognition. Examples of the models may include, but are not limited to, an artificial neural network (ANN) model, a convolutional neural network (CNN) model, a fully convolutional network (FCN) model, a recurrent neural network (RNN) model, a decision tree model, a support-vector machine (SVM) model, a regression analysis model, a Bayesian network model, a Gaussian process, a genetic algorithm, a belief theory and the like, or a combination of two or more thereof.

BRIEF DESCRIPTION OF THE DRAWINGS

Some embodiments and examples of the present disclosure will now be discussed in detail by referring to the following figures. The embodiments and examples, with reference to the accompanying drawings, are given as examples only, and they should not be interpreted as being limiting.

FIG. 1 shows a block diagram depicting a configuration of a computer system 100 for classifying an IR image according to some embodiments. The computer system 100 may include models' requirement acquisition module 101, an image acquisition module 102, an object annotation module 103, an object characteristics calculation module 104, a temperature relationship determining module 105, an image classification module 106, and a training module 107.

Figure 1:
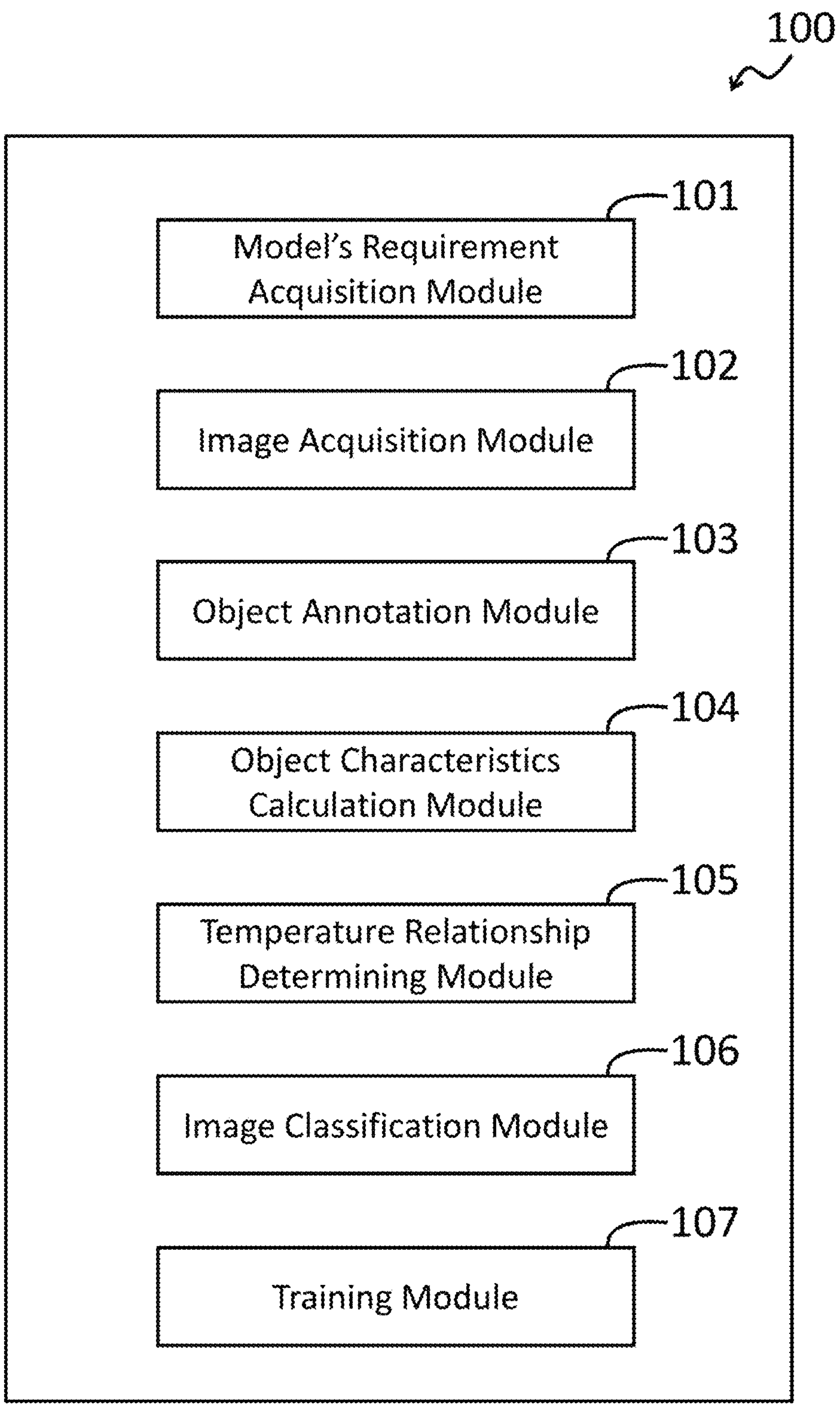
FIG. 1 shows a block diagram depicting modules of a computer system, according to an embodiment.

The model's requirement acquisition module 101 is a module for acquiring requirements or conditions of the machine learning models to be trained, used for the classification to be carried out. The requirements or conditions may be related to temperature of the objects or the pixel values of the IR image which are related to the temperature of the object. For example, the difference in temperature between the target object and the comparison object may be used to decide for which machine learning model the IR image is used. The difference in temperature may be defined as the difference in a parameter calculated from the pixel values of an object in the IR image.

The image acquisition module 102 is a module for acquiring images necessary for the classification. The module 102 may acquire an IR image to be classified. The module 102 may also acquire a RGB image taken to include the same field of view as the IR image.

The object annotation module 103 is a module for annotating the objects in the IR image. In some embodiments, the module 103 may first annotate the necessary objects, i.e. the target object and the comparison object, in the corresponding RGB image, and then overlap or compare the two images and annotate the pixels corresponding to those objects in the IR image. If either one or both of the objects cannot be annotated in the RGB image or the IR image, the IR image may not be used for the classification and/or the training.

The object characteristics calculation module 104 is a module for calculating characteristics of the objects, which are used to determine the temperature relationship used for the classification. In some embodiments, the characteristics to be calculated may be a parameter related to the temperature of the objects. For example, the characteristics may be a parameter calculated on the basis of the pixel values of the pixels annotated as the object.

In some embodiments, the characteristic of an object may be a statistical value of the pixel values of the pixels annotated as the object. For example, the statistical value may be an average of the pixel values of the pixels of the object in the IR image. For example, the characteristic of the target object may be an average of the pixel values of the pixels annotated as the target object in the IR image. For example, the characteristic of the comparison object may be an average of the pixel values of the pixels annotated as the comparison object in the IR image.

In some embodiments the characteristic of the target object and the characteristic of the comparison object may be defined in the same way. In some embodiments, they may be defined differently.

The temperature relationship determination module 105 is a module for determining a temperature relationship between the target object and the comparison object in the IR image. In some embodiments, the temperature relationship may be a difference in parameter related to the pixel values of the pixels in the IR image between the target object and the comparison object. For example, the temperature relationship may be a difference in a statistical value of the pixel values of the pixels in the IR image between the target object and the comparison object. For example, the temperature relationship may be a difference in the average of the pixel values of the pixels in the IR image between the target object and the comparison object.

The image classification module 106 is a module for classifying the IR image, in other words for selecting a machine learning model among the multiple machine learning models and classifying the IR image into the training data to be used for the training of the machine learning model. In some embodiments, a machine learning model is selected on the basis of the difference in the average of the pixel values in the IR image between the target object and the comparison object.

In some embodiments, two machine learning models, for example a "hot weather model" and a "cold weather model", are provided from which to select one. The average of the pixel values of the comparison object is greater than that of the target object, the IR image is classified to the training data of the "hot weather model". The average of the pixel values of the comparison object is smaller than that of the target object, the IR image is classified to the training data of the "cold weather model".

In some embodiments, more than two machine learning models, for example model 1, model 2, . . . , and model N in function of temperature or pixel value. The value of the difference in the average of the pixel values in the IR image between the target object and the comparison object may be used to select which model among those provided models.

The training module 107 is a module for training the provided machine learning models. If a certain amount of IR images have been classified for the machine learning models can then be trained using the classified IR images. In some embodiments, a computer system 100 may be used for classifying IR images for the provided multiple machine learning models and not used for training the machine learning models. In such embodiments, the system may or may not include the training module 107.

Figure 2:
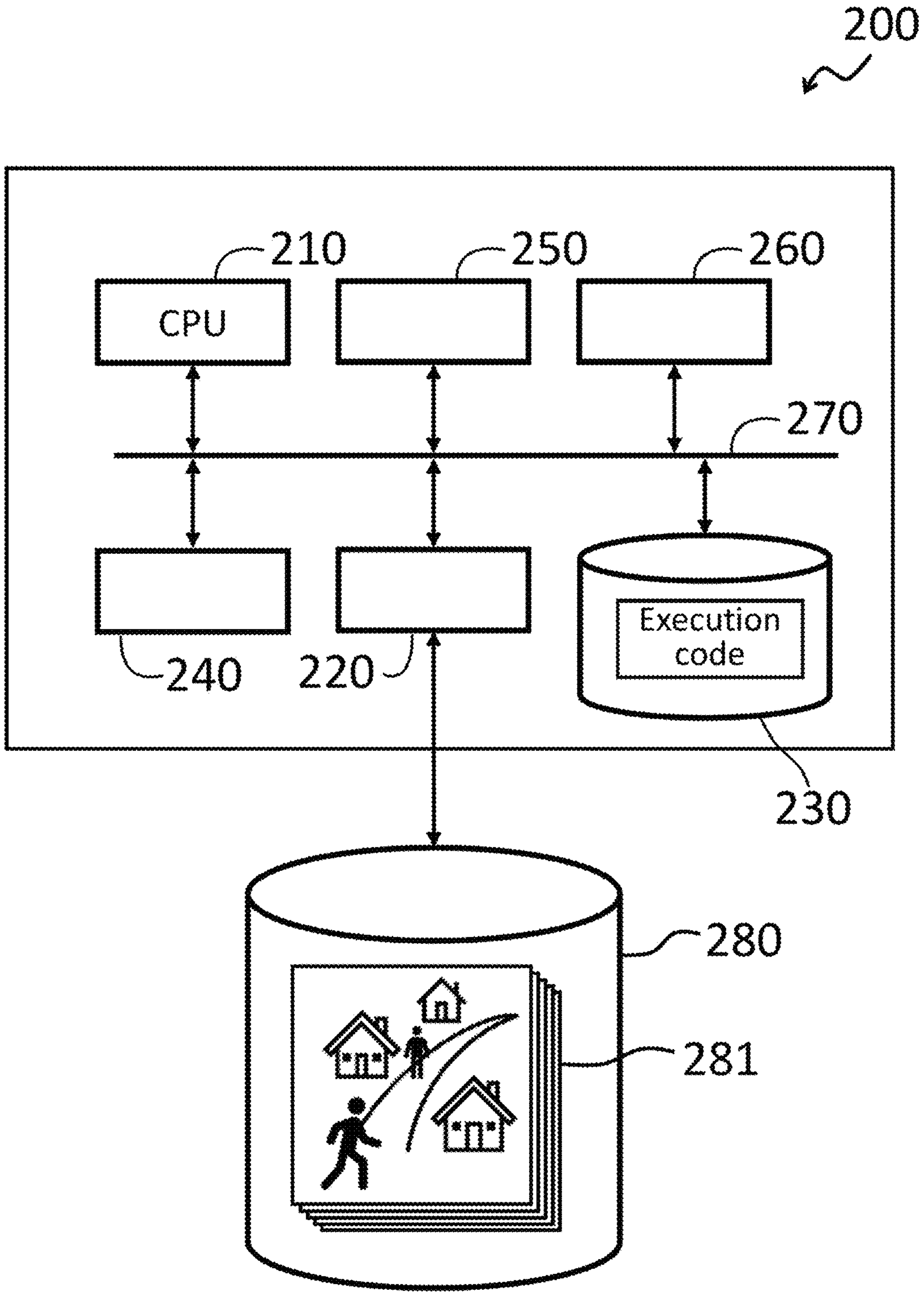
FIG. 2 shows a block diagram depicting components of a computing device, according to an embodiment.

FIG. 2 shows a block diagram of a computing device 200 that may function as the computer system 100 including modules 101 to 107 as shown in FIG. 1, for classifying an IR image according to some embodiments. The computing device 200 may include a central processing unit processor (CPU) 210, a chip or any suitable computing or computational unit; a communication unit 220; a storage medium 230; a memory 240; which are connected with each other and/or can be communicated via a bus 270. The computing device 200 is connected, or can communicate with, an external storage 280 which stores images such as IR images and RGB images.

The processor 210 may include an arithmetic logic unit, a microprocessor, a general-purpose controller, a single core or multicore processor, or multiple processors for parallel computations. The processor 210 may include, or be a part of, an electronic control unit ("ECU") of the vehicle (not shown in FIG. 2). Although FIG. 2 shows a single processor 210, multiple processors may be included.

The communication unit 220 is configured to communicate with the external storage medium 280.

The storage medium 230 may be a non-transitory storage medium that stores programs and data therein for providing the functionality described herein. The storage medium 230 may store a software or code to be executed by the processor 210, to classify the IR images and train the machine learning models using the classified IR images. The storage medium 230 may be, but is not limited to, a dynamic random access memory (DRAM) device, a static random access memory (SRAM) device, flash memory, or some other memory devices, for example, any type of the cloud storage. In some embodiments, the storage medium 230 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The memory 240 may store instructions or data that may be executed by the processor 210. The instructions or data may include code for performing the techniques described herein. The processor 210 may move the programs or program codes and other data stored in the storage medium 230 and the image data stored in the external storage medium 250 to the memory 240, and execute and/or use them. The memory 240 may be, but is not limited to, a dynamic random access memory (DRAM) device, a static random access memory (SRAM) device, flash memory, or some other memory device. In some embodiments, the memory 240 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The external storage medium 260 may store the IR images to be classified and trained by the computer device 200. The external storage medium 260 may receive the IR images with the classification information from the computer device 200, and store them therein. The classified IR images may be read by the computer device 200 for training the machine learning models.

Figure 3:
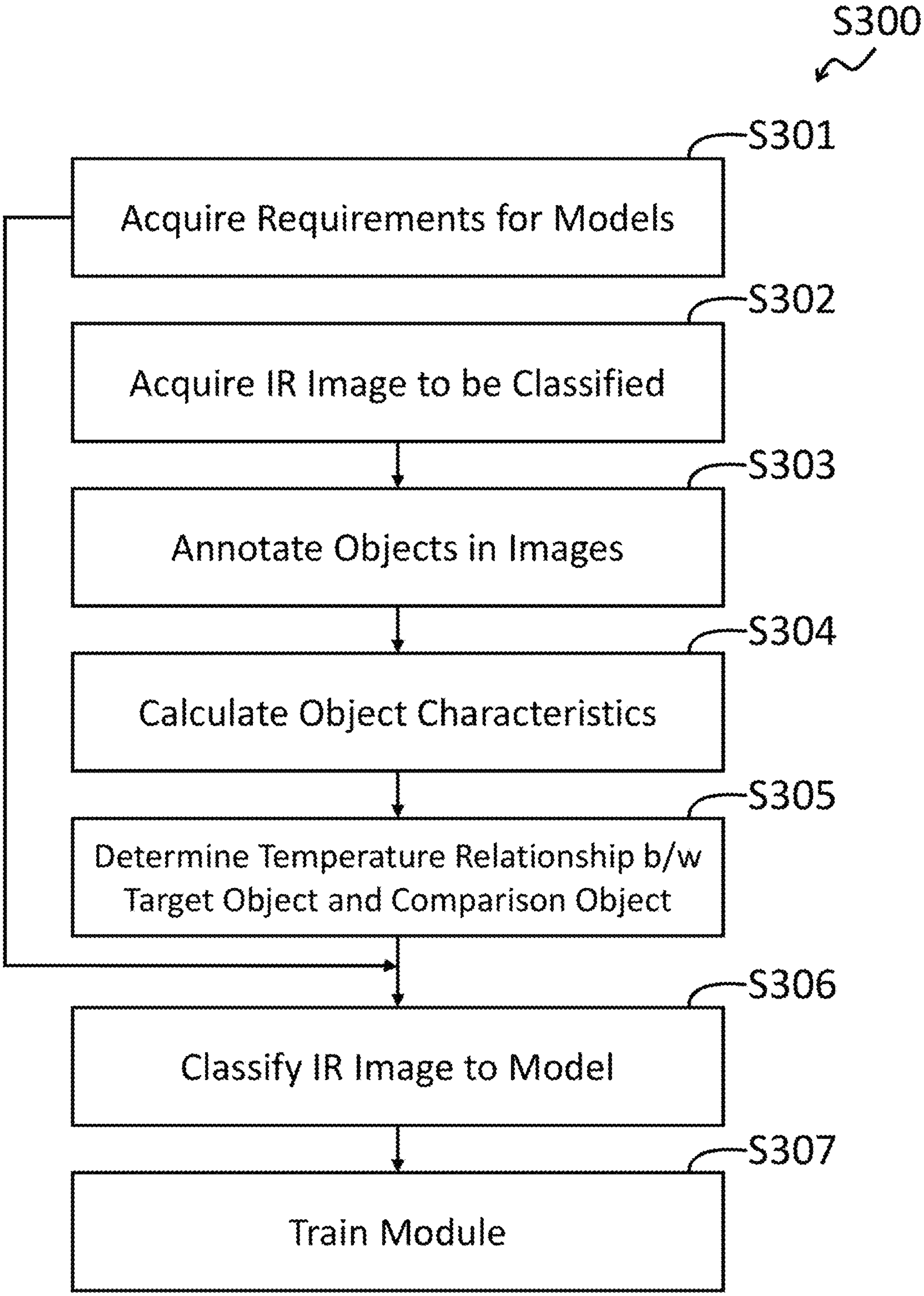
FIG. 3 shows a flow chart of a method of classifying IR images and training the modules using the classified IR images, according to an embodiment.

FIG. 3 shows a flow chart S300 of a method of classifying IR images and training the modules using the classified IR images, according to an embodiment. A plurality or a set of machine learning models to be trained are first determined. Each of the set of multiple machine learning models has its own specific requirements or conditions that differ from those of the other models. Therefore, the requirements of each of all the models to be trained are acquired (S301).

An IR image to be classified by the set of machine learning models is acquired (S302). In some embodiments, an individual IR image is acquired (S302) for a classification process (S303 to S306). A corresponding RGB image may also be acquired if necessary.

Next, the target objects and the comparison objects are annotated in the IR images (S303). Typically, the target object may be a pedestrian and the comparison object may be a road surface. As explained in this Specification, the target objects and the comparison objects are annotated in the corresponding RGB image. The pixels in the IR image that correspond to the target objects and the comparison objects annotated in the RGB image are identified or annotated.

The characteristics of the target objects and the comparison objects are calculated (S304). In some embodiments, the characteristic of the object may be a statistical value of the pixel values of the pixels of the object of the IR image. For example, an average of the pixel values of the pixels can be calculated.

The characteristic of the target object and the characteristic of the comparison object are compared, to determine the temperature relationship between the target object and the comparison object in the IR image (S305). For example, the average pixel value of the comparison object is compared to the average pixel value of the target object. The difference between the two average pixel values may be used as a temperature relationship.

The determined temperature relationship (S305) is compared with the requirements of the modules (S301), to determine to which machine learning model the IR image should be classified (S306).

By repeating the classification steps S302 to S306 over a number of IR images, a sufficient size of training data can be generated for each of the machine learning models. Thus, the set of the machine learning models are now trained using the appropriately classified IR images (S307).

Embodiment 1

Figure 4:
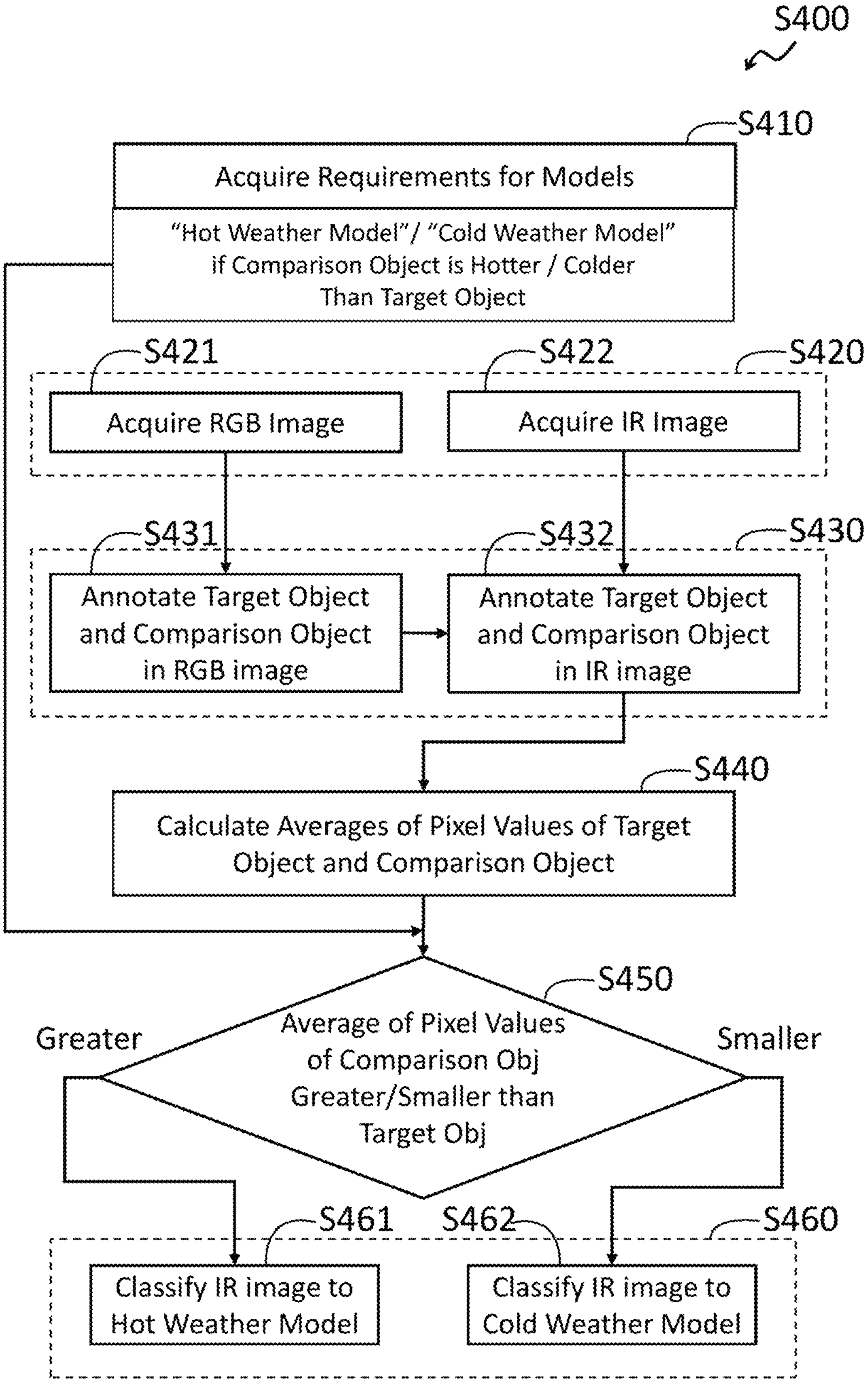
FIG. 4 shows a flow chart of a method of classifying IR images, according to an embodiment.

FIG. 4 shows a flow chart S400 of a method of classifying IR images, according to an embodiment. In FIG. 4, the set of the models is composed of two models, or a "hot weather model" and a "cold weather model".

The requirements or conditions for the two models are acquired (S410). The "hot weather model" should be applied if the environment temperature is higher or the comparison object appears brighter or whiter than a target object, for example a pedestrian in the IR image. Thus, if the comparison object, for example a road surface, is hotter, brighter or whiter in the IR image, than the target object, for example a pedestrian, then the IR image should be used to train the "hot weather model". If the comparison object, for example a road surface, is colder, darker or blacker in the IR image, than the target object, for example a pedestrian, then the IR image should be used to train the "cold weather model".

The images are acquired from an image database (not shown) (S420). In FIG. 4, an IR image to be classified is acquired (S422). In addition, an RGB image that was taken in the same field of view as the IR image is also acquired (S421).

Then the annotation of the target object and the comparison object is carried out (S430). In FIG. 4, the RGB image is processed to annotate target objects and comparison objects therein (S431). Then the RGB image is overlapped with the IR image, to annotate the pixels of the IR image that overlap with the objects annotated in the RGB image as the target object or as the comparison object (S432).

Pixel values of all the pixels annotated as the target object or the comparison object are taken from the image information. An average of the pixel values of the pixels of each object is calculated as a temperature relationship (S440).

Now the pixel value averages of the target object and the comparison object (S440) are compared (S450) with the requirements of the models (S410). Accordingly, it is determined to which model the IR image should be classified (S460).

If the pixel value average of the comparison object, for example the road surface, is higher or greater than that of the target object, for example a pedestrian, it means that the environment is hot. Accordingly, the IR image is determined to be used to train the "hot weather model" (S461). If the pixel value average of the comparison object, for example the road surface, is lower or smaller than that of the target object, for example a pedestrian, it means that the environment is hot. Accordingly, the IR image is determined to be used to train the "cold weather model" (S462).

Figure 5:
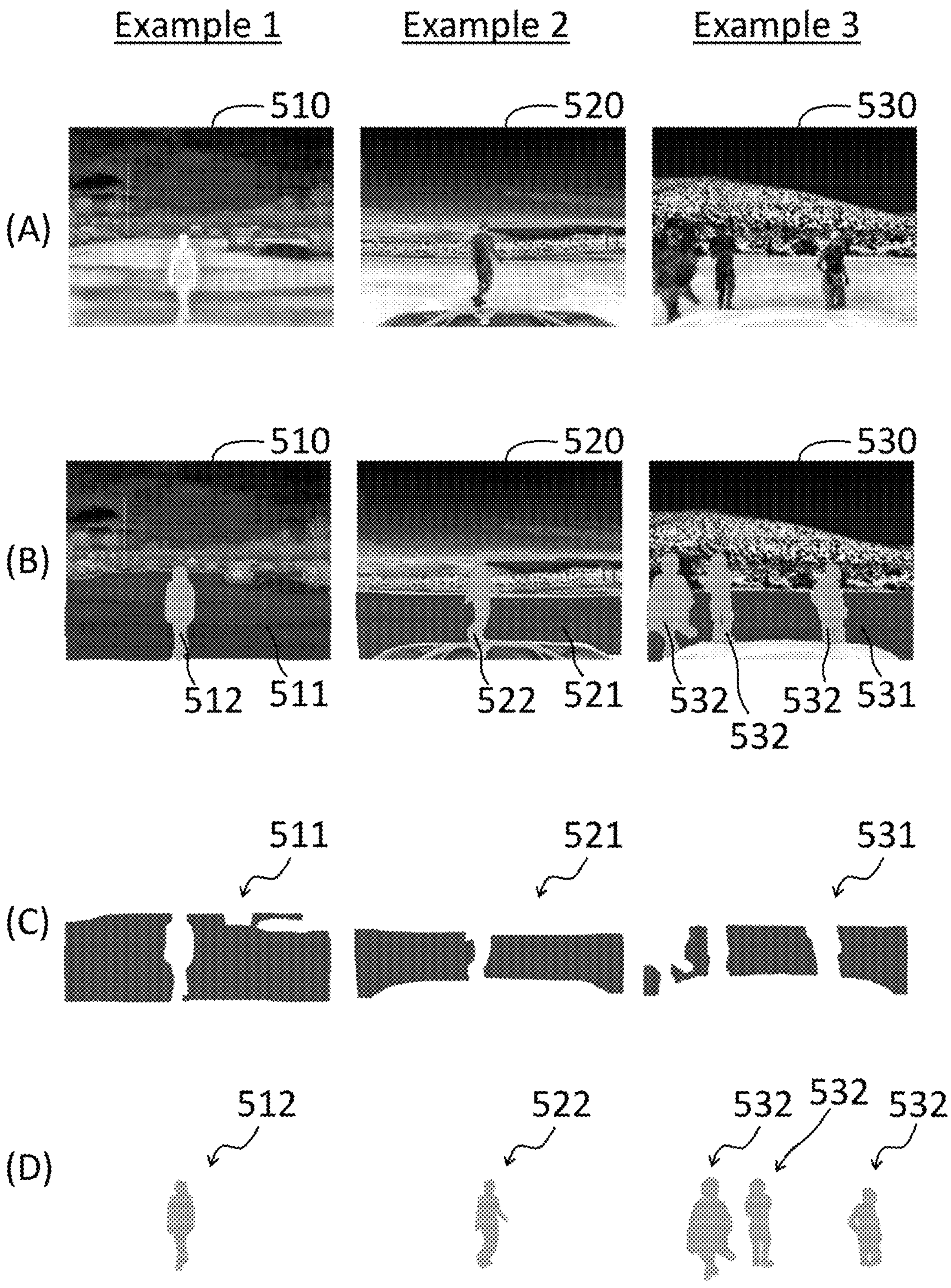
FIG. 5 shows images of three examples to explain a process of the image classification according to an embodiment.

FIG. 5 shows images of three examples to explain a process of the image classification according to an embodiment. FIG. 5A shows IR images of Examples 1 to 3. Example 1 is an IR image 510 in which the pedestrian appears brighter than the environment. Examples 2 and 3 are IR images 520 and 530 in which the pedestrians appear darker than the environment. The target objects are pedestrians, and the comparison objects are road surfaces in these Examples.

RGB images were also taken (not shown). The SemSeg model was used to annotate the pedestrians and road surfaces (not shown). The RGB images were overlapped with the IR images (FIG. 5B). The pixels of the IR image that overlap with the areas annotated as pedestrians in the RGB images were annotated as "pedestrian pixels" 512, 522, and 532. Similarly, the pixels of the IR image that overlap with the areas annotated as road surfaces in the RGB images were annotated as "road surface pixels" 511, 521, and 531. FIG. 5C shows only the areas or pixels corresponding to the road surfaces 511, 521, and 531. FIG. 5D shows only the areas or pixels corresponding to the pedestrian pixels 512, 522, and 532.

The average of the pixel values of the pixels of the road surfaces (AVG_Road) was calculated for Examples 1 to 3. In the images, more than one segments or regions were annotated as "road surface". Examples 1 and 2 had two segments, and Example 3 had four segments as "road surface". All the pixels of all the segments annotated as "road surface" were used for the average calculation, or, more generally speaking, for obtaining the characteristics of the comparison object.

Similarly, the average of the pixel values of the pixels of the pedestrians (AVG_Pedestrian) was calculated for Examples 1 to 3. Examples 1 and 2 had only one pedestrian in the image, while Example 3 had three pedestrians in the image. All the pixels of all the segments annotated as "pedestrian" were used for the average calculation, or more generally for obtaining the characteristics of the target object.

These two averages were compared. The results were as follows:

Example 1: AVG_Road<AVG_Pedestrian
Example 2: AVG_Road>AVG_Pedestrian
Example 3: AVG_Road>AVG_Pedestrian Based on the results, the images of Examples 1 to 3 were classified to be used for training the following:

Example 1: Cold weather model
Example 2: Hot weather model
Example 3: Hot weather model

Embodiment 2

Figure 6:
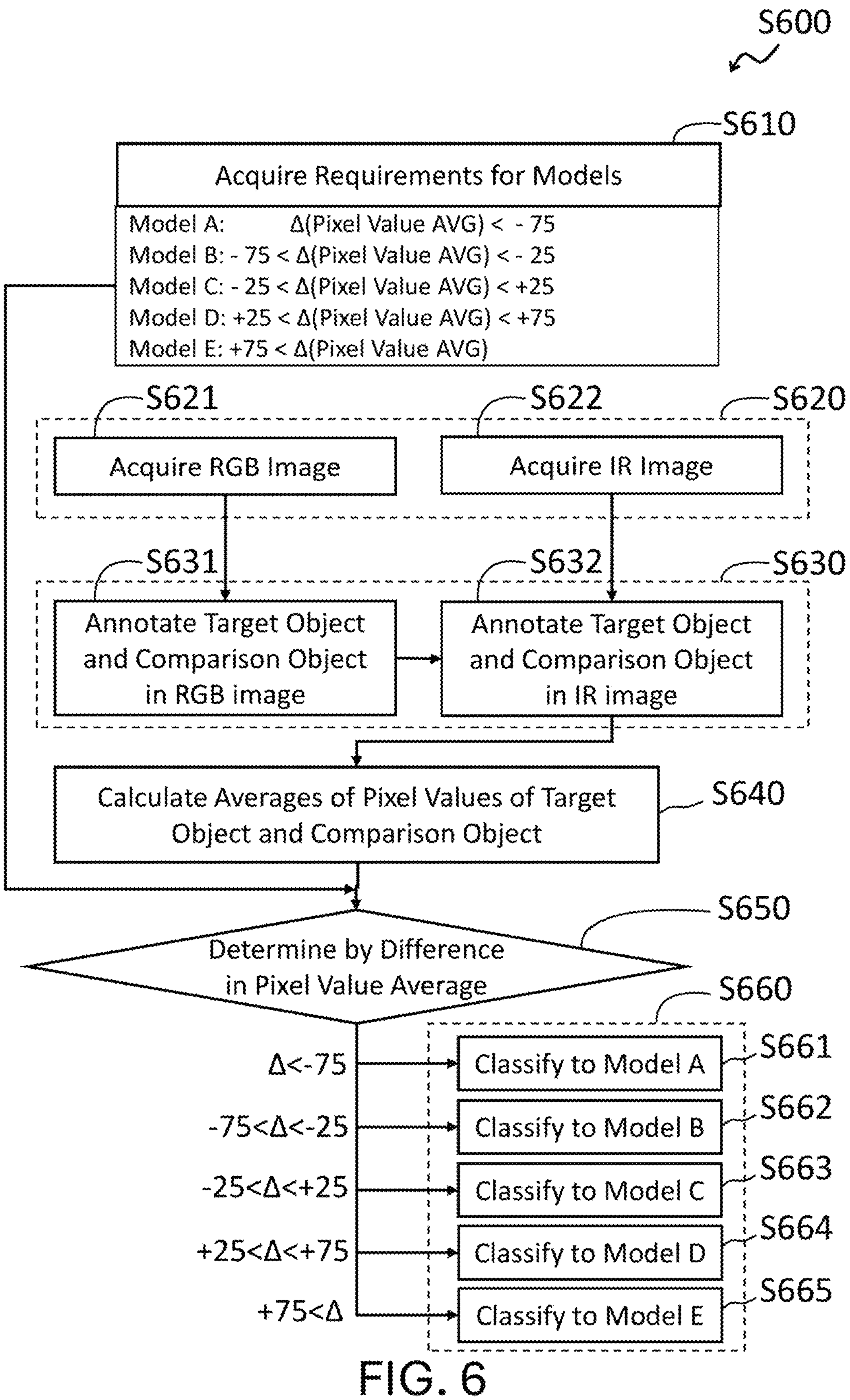
FIG. 6 shows a flow chart of a method of classifying IR images, according to an embodiment.

FIG. 6 shows a flow chart S600 of a method of classifying IR images, according to an embodiment. In FIG. 6, the set of the models is composed of five models A, B, C, D and E.

The requirements or conditions for the five models are acquired (S610). The requirements of each models for the IR images to be used are defined in accordance with the difference in pixel value average between the target object and the comparison object ("Δ(Pixel Value AVG"). An example of the requirements is shown in the figure, as follows:

$$\Delta(\text{Pixel Value } AVG) < TH_{AB} \text{ (e.g. } -75) \quad \text{Model A}$$

$$TH_{AB} \text{ (e.g. } -75) < \Delta(\text{Pixel Value } AVG) < TH_{BC} \text{ (e.g. } -25) \quad \text{Model B}$$

$$TH_{BC} \text{ (e.g. } -25) < \Delta(\text{Pixel Value } AVG) < TH_{CD} \text{ (e.g. } +25) \quad \text{Model C}$$

$$TH_{CD} \text{ (e.g. } +25) < \Delta(\text{Pixel Value } AVG) < TH_{DE} \text{ (e.g. } +75) \quad \text{Model D}$$

$$TH_{DE} \text{ (e.g. } +75) < \Delta(\text{Pixel Value } AVG). \quad \text{Model E}$$

The pixel values shown above and in FIG. 6 for the thresholds TH are merely examples. Other values may be set as the thresholds.

The images are acquired from an image database (not shown) (S620). In FIG. 6, an IR image to be classified is acquired (S622). In addition, a RGB image that was taken in the same field of view as the IR image is also acquired (S622).

Then the annotation of the target object and the comparison object is carried out (S630). In FIG. 6, the RGB image is processed to annotate target objects and comparison objects therein (S631). Then the RGB image is overlapped with the IR image, to annotate the pixels of the IR image that overlap with the objects annotated in the RGB image as the target object or as the comparison object (S632).

Pixel values of all the pixels annotated as the target object or the comparison object are taken from the image information. An average of the pixel values of the pixels of each object is calculated (S640).

Now the pixel value averages of the target object and the comparison object (S640) are compared (S650) with the requirements of the models (S610). Accordingly, it is determined to which model the IR image should be classified (S660).

The difference in pixel value average between the target object and the comparison object, "Δ(Pixel Value AVG)" or simply "Δ" as used in FIG. 6.

Based on the results, the model to which the image is used for training is determined as follows:

$$\text{if } \Delta(\text{Pixel Value } AVG) < TH_{AB} \text{ (e.g.} -75\text{), then Model } A \text{ (}S661\text{);}$$

$$\text{if } TH_{AB} \text{ (e.g.} -75\text{)} < \Delta(\text{Pixel Value } AVG) < TH_{BC} \text{ (e.g.} -25\text{), then Model } B \text{ (}S662\text{);}$$

$$\text{if } TH_{BC} \text{ (e.g.} -25\text{)} < \Delta(\text{Pixel Value } AVG) < TH_{CD} \text{ (e.g.} +25\text{), then Model } C \text{ (}S663\text{);}$$

$$\text{if } TH_{CD} \text{ (e.g.} +25\text{)} < \Delta(\text{Pixel Value } AVG) < TH_{DE} \text{ (e.g.} +75\text{), then Model } D \text{ (}S664\text{); and}$$

$$\text{if } TH_{DE} \text{ (e.g.} +75\text{)} < \Delta(\text{Pixel Value } AVG)\text{, then Model } E \text{ (}S665\text{).}$$

In some embodiments, the process of classifying each IR image to a specific model can be repeated. After the first IR image classification, a second IR image classification may be performed to calculate the average pixel values again. This process may be repeated for multiple cycles. The objects may be identified differently, or the pixels annotated as the objects may change. Thus, the average pixel values for the objects may evolve.

Embodiment 3: Pedestrian Detection

The present disclosure also provides a method of recognizing a target object using a set of machine learning models trained in function of temperature, which have been trained by using the training data of the classified IR images. The trained set of machine learning models may be used by vehicles to detect pedestrian or for pedestrian detection (PD) or night vision (NV) as a pedestrian detection system or an advanced driver assistance system (ADAS).

Figure 7:
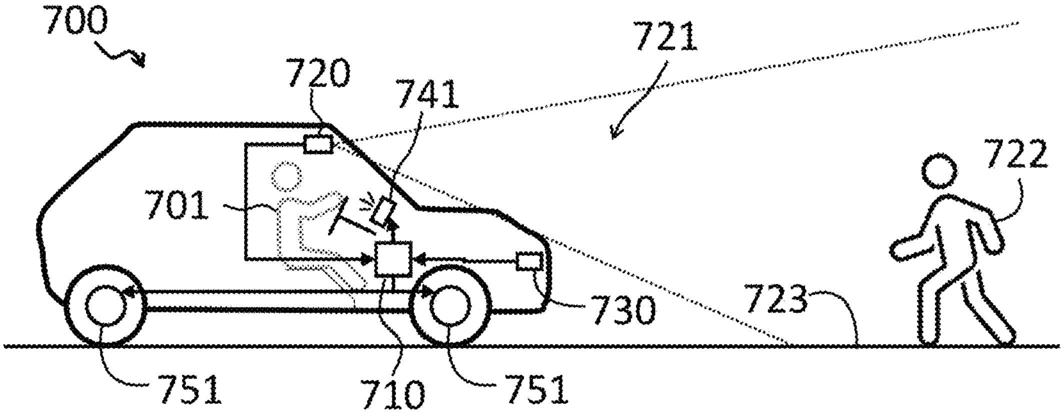
FIG. 7 shows a vehicle according to an embodiment.

The present disclosure also provides an onboard vehicle computer system or unit. FIG. 7 shows a vehicle 700 according to an embodiment. The vehicle 700 has an electronic control unit (ECU) 710, an IR camera 720, and an ambient temperature sensor 730.

Figure 8:
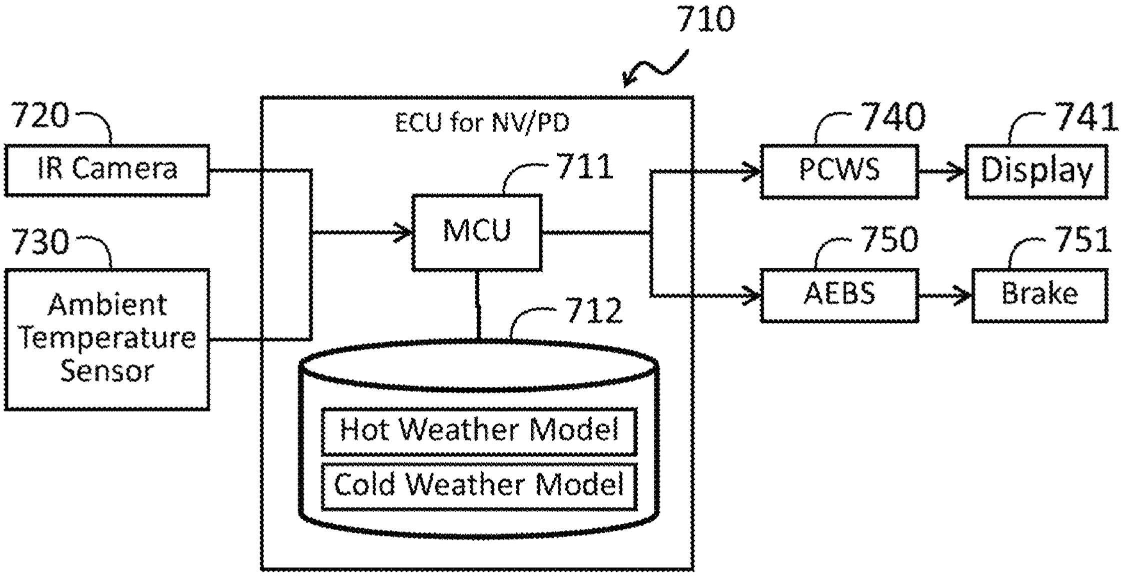
FIG. 8 shows a block diagram of an electronic control unit and other components of the vehicle, according to an embodiment.

The vehicle 700 further has a pedestrian collision warning system (PCWS) 740, a display 741, an advanced emergency braking system (AEBS) 750, and brakes 751. FIG. 8 shows a block diagram of the ECU 710 and PCWS 740, the display 741, AEBS 750, and brakes 751.

In FIG. 8, PCWS 740 and AEBS 750 are configured separately from ECU 710. But the configuration of the computer systems of the present disclosure should not be interpreted to be limiting to that of FIG. 8. Either one or both PCWS 740 and AEBS 750 may be included in the ECU 710. PCWS 740, AEBS 750 and ECU 710 may share a part or an entirety of the components. One of PCWS 740, AEBS 750 and ECU 710 may be included in another of them.

Referring to FIGS. 7 and 8, a process of pedestrian detection will be explained below. The IR camera 720 is disposed in the vehicle 700 and has a field of view 721 in the moving direction to capture objects in it, including any pedestrian 722 as a target object and a road surface 723 as a comparison object. The IR camera 720 captures IR images at a certain frame rate, and sends each image or frame that has been captured to the ECU 710.

The ambient temperature sensor 730 measures the ambient temperature or the temperature of the outside air and sends the measured temperature data to the ECU 710.

The ECU 710 may include a microcontroller (MCU) 711 and a storage medium 712 storing machine learned models. Such a microcontroller 711 may include a central processing unit (CPU), a memory and an I/O port (not shown). The storage medium 712 stores execution codes to be executed by the MCU 711. In FIG. 8, a set of two models, or "hot weather model" and "cold weather model" is shown as an example. These models have already been trained by IR images classified by applying a classification method according to an embodiment of the present disclosure.

The MCU 711 receives the temperature data from the ambient temperature sensor 730 and IR images or frames from the IR camera 720. The MCU 711 selects which model to use, and uses the selected model to detect a pedestrian 722 in the moving direction of the vehicle 700. If a pedestrian 722 is detected, the MCU 711 may control the PCWS 740 to send a warning signal to a driver 701 via a device, for example, a display 741. It assists the driver 701 to recognize the pedestrian 722 and to continue a safe driving. Alternatively or in addition, the MCU 711 may control the AEBS 750 to activate the brake 751 to stop the vehicle 700. This can prevent the vehicle 700 from possibly colliding the pedestrian 722.

Figure 9:
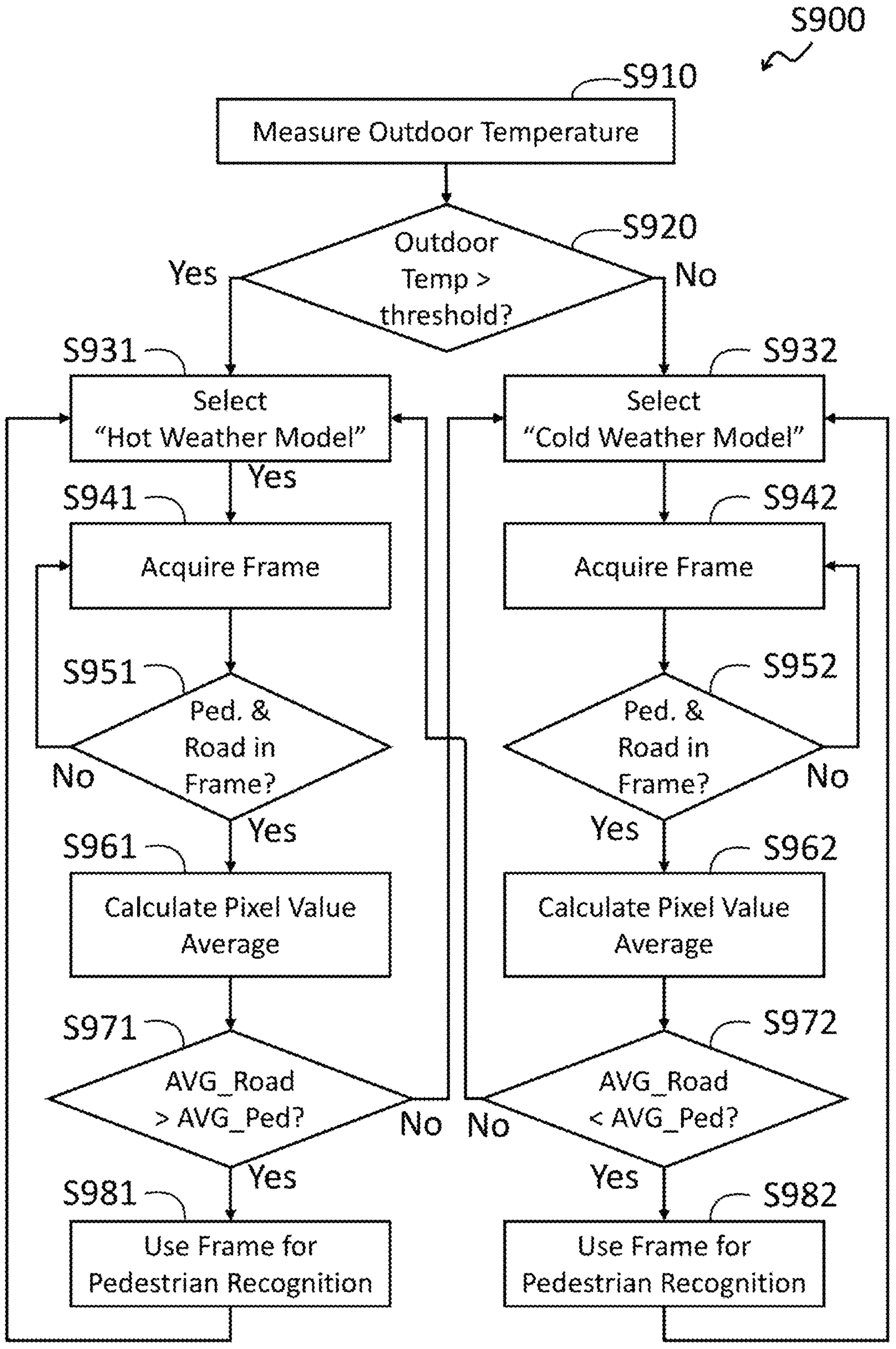
FIG. 9 shows a flow chart for the process of the pedestrian detection with two machine-learned models.

Referring to FIG. 9, the process S900 of the pedestrian detection with two machine learned models, performed by the vehicle 700 will be explained below.

To start with, a model should be selected between the two models. In some embodiments, a predetermined one may be used. In some embodiments, the model to be used first may be determined based on the ambient temperature. In this case, the ECU 710 instructs the ambient temperature sensor 730 to send the current ambient or outdoor temperature (S910). The ECU 710 then reads a threshold temperature stored in the storage medium 712, and compares the ambient temperature sent from the ambient temperature sensor 730 and the threshold (S920).

If the ambient temperature is higher than the threshold (S920), the ECU 710 decides to select and use the "hot weather model" (S931). The ECU 710 continuously receives the IR frames from the IR camera 720 (S941), and process each IR frame. The ECU 710 uses the "hot weather model" and determines whether a pedestrian 722 and a road surface 722 are both captured in the frame (S951). If at least one or both of them are not detected in the frame (S951), the ECU 710 starts to process the next frame (S941).

If both of them are detected in the frame (S951), the ECU 710 calculates the pixel value averages for both the pedestrian 722 and the road surface 723 (S961), and compares them (S971). If the pixel value average of the road surface 723 is greater than that of the pedestrian 722, it means that the "hot weather model" should be used (S971). Accordingly, the "hot weather model" is used for the recognition of the pedestrian 722 or any necessary process of the pedestrian detection (S981). If the pixel value average of the road surface is smaller than that of the pedestrian 722, it means that the "cold weather model" should be used (S971). Thus, the ECU 710 decides to switch the model to the "cold weather model" (S932).

If the ambient temperature is lower than the threshold (S920) or if the decision has been made that the "hot weather model" should not be used (S971), the ECU decides to use the "cold weather model" (S932). The ECU 710 continuously receives the IR frames from the IR camera 720 (S942), and process each IR frame. The ECU 710 uses the "cold weather model" and determines whether a pedestrian 722 and a road surface 723 are both captured in the frame (S952). If at least one or both of them are not detected in the frame (S952), the ECU 720 starts to process the next frame (S942).

If both of them are detected in the frame (S952), the ECU 710 calculates the pixel value averages for both the pedestrian and the road surface 723 (S962), and compares them (S972). If the pixel value average of the road surface is smaller than that of the pedestrian 722, it means that the "cold weather model" should be used (S972). Accordingly, the "cold weather model" is used for the recognition of the pedestrian 722 or any necessary process of the pedestrian detection (S982). If the pixel value average of the road surface 723 is greater than that of the pedestrian 722, it means that the "hot weather model" should be used (S972). Thus, the ECU 710 decides to switch the model to the "hot weather model" (S931), and to process the steps S941 to S981 as explained above.

The ECU 710 may serve as pedestrian detection system (PD) or night vision (NV). The ECU 710 may include a microcontroller 711. Such a microcontroller 711 may include a central processing unit (CPU), a memory and an I/O port (not shown).

The present disclosure also provides the following embodiments:

A001. A method comprising:
- (i) providing a set of machine learning models in function of temperature;
- (ii) acquiring an infrared image;
- (iii) identifying a target object to be detected and a comparison object in the infrared image;
- (iv) calculating a first characteristic of the target object in the infrared image and a second characteristic of the comparison object in the infrared image; and
- (v) based on the first characteristic of the target object and the second characteristic of the comparison object, selecting a machine learning model among the set of machine learning models in function of temperature for the IR image.

A002. The method of A001 or any other embodiment, the method being a method of classifying an IR image to be used for training a machine learning model.

A011. The method of A001 or any other embodiment, wherein the target object is a pedestrian.

A012. The method of A001 or any other embodiment, wherein the comparison object is a road surface.

A021. The method of A001 or any other embodiment, wherein said identifying the target object to be detected and a comparison object in the infrared image comprises using a semantic segmentation model.

A022. The method of A001 or A021, or any other embodiment,
wherein said identifying the target object to be detected and a comparison object in the infrared image comprises generating a sematic segmentation image from a RGB image taken in the same field of view as the acquired infrared image.

A031. The method of A001 or any other embodiment, wherein the step (v) further comprises classifying the infrared image into training data to be used to train the selected machine learning model.

A041. The method of A001 or any other embodiment, wherein the step (v) further comprises determining a temperature relationship between the first characteristic and the second relationship.

A042. The method of A041 or any other embodiment,
wherein the first characteristic of the target object is a statistical value of pixel values of the pixels corresponding to the target object in the infrared image, and/or
wherein the second characteristic of the comparison object is a statistical value of the pixel values of the pixels corresponding to the target object in the infrared image.

A043. The method of A001 or A042, or any other embodiment,
wherein the statistical value of the target object is an average of pixel values of a part or the entirety of the pixels corresponding to the target object in the infrared image, and/or
wherein the statistical value of the comparison object is an average of pixel values of a part or the entirety of the pixels corresponding to the target object in the infrared image.

A044. The method of A043 or any other embodiment,
wherein said determining a temperature relationship between the first characteristic and the second relationship comprises determining which of the average of the pixel values of the target object is greater or smaller than the average of the pixel values of the comparison object.

A051. The method of A001 or any other embodiment,
wherein the set of machine learning models in function of temperature comprise:
a hot-weather model used when the comparison object is hotter than the target object; and
a cold-weather model used when the comparison object is colder than the target object.

A101. A method executed by a processor for detecting a target object in an infrared image for an image recognition,
- (a) providing the set of machine-learned models trained by using the method of any one of A001 to A0051, or any embodiment;
- (b) acquiring an infrared image;
- (c) acquiring an outside temperature related to the infrared image;
- (d) based on the outside temperature, selecting a machine-learned model among the plurality of machine-learned models;
- (e) using the selected model to identify whether the infrared image includes a target object and a comparison object;
- (f) if either one or both of a target object and a comparison object is not identified in the infrared image, repeating the steps (b) to (e);
- (g) if a target object and a comparison object are both identified in the infrared image, calculating the first characteristic of the target object in the infrared image and the second characteristic of the comparison object in the infrared image;
- (h) based on the first characteristic of the target object and the second characteristic of the comparison object, selecting a machine learning model among the plurality of machine learning models in function of temperature;
- (i) if the acquired outside temperature is within the temperature range of the selected machine learning model, determining the selected machine learning model as the model to be used;

(j) if the acquired outside temperature is not within a temperature range of the selected machine learning model, selecting another machine learning model that corresponds to the acquired outside temperature, and determining the selected another machine learning model as the model to be used; and (k) using the determined model to be used for the image recognition of the target object.

B001. An onboard vehicle computer unit for detecting a target object in an IR image, the unit comprising:

a processor;

a storage in which machine readable program codes are stored, that, when executed by the processor, cause the processor to perform the method of A101 or any embodiment.

C001. A non-transitory computer readable storage medium comprising program codes for detecting a target object in an IR image, the program codes that, when executed by a processor, cause the processor to perform the method of A101 or any embodiment.

D001. A computer program product comprising program codes for detecting a target object in an IR image, the program codes that, when executed by a processor, cause the processor to perform the method of A101 or any embodiment.

E001. A vehicle having an IR camera, an outside temperature sensor, and the onboard vehicle computer unit according to B001 or any embodiment or the non-transitory computer readable storage medium according to C001 or any embodiment.

The terms and expressions using inequality such as “<”, “>”, “greater than”, “smaller than”, “higher than” “lower than” and the like used herein should not be interpreted in a limiting manner. These expressions are used to avoid repeating expressions such as “including equality” for simplicity, and may include the meaning thereof.

Terms and phrases used in this application, and variations thereof, especially in the appended claims, unless otherwise expressly stated, should be construed as being open-ended rather than being closed. As examples of the foregoing, the term ‘including’ should be understood to mean ‘including, without limitation,’ ‘including but not limited to,’ or the like; the term ‘comprising’ as used herein is synonymous with ‘including,’ ‘containing,’ or ‘characterized by,’ and is inclusive or open-ended and does not exclude additional, unrecited elements or method steps; the term ‘having’ should be interpreted as ‘having at least;’ the term ‘includes’ should be interpreted as ‘includes, but is not limited to;’ the term ‘example’ is used to provide exemplary instances of the item in discussion, not an exhaustive or limiting list thereof.

A group of items linked with the conjunction ‘and’ should not be read as requiring that each and every one of these items be present in the grouping, but rather should be understood as ‘and/or’ unless expressly stated otherwise. Similarly, a group of items linked with the conjunction ‘or’ should not be understood as requiring mutual exclusivity among that group, but rather should be understood as ‘and/or’ unless expressly stated otherwise.

With respect to the use of substantially any plural or singular term herein in the English language, those skilled in the art can understand the plural and the singular as appropriate according to context and the use. The various singular and plural permutations may be expressly set forth herein for the sake of clarity. The indefinite article “a” or “an” does not exclude a plurality.

Any of the embodiments or any of the aspects disclosed herein is independently combinable, in part or in whole, with other embodiments described herein in any way, e.g., one, two, or three or more embodiments may be combinable in whole or in part. Furthermore, any of the features of any of the embodiments or any of the aspects disclosed herein is applicable to any of the other embodiments and aspects, or may be made optional for other embodiments or aspects.

While preferred embodiments of the present invention have been shown and described herein, it will be obvious to those skilled in the art that such embodiments are provided by way of example only. It is not intended that the invention be limited to the specific examples provided within the specification. While the invention has been described with reference to the aforementioned specification, the descriptions and illustrations of the embodiments and examples herein are not meant to be construed in a limiting sense. Numerous variations, changes, and substitutions can be conceived by those skilled in the art without departing from the concept of the invention. Furthermore, it shall be understood that no aspects of the invention are limited to the specific depictions, configurations, or relative proportions set forth herein which depend upon a variety of conditions and variables. It should be understood that various alternatives to the embodiments of the invention described herein may be employed in practicing the invention. It is therefore to be understood that the invention shall also cover any such alternatives, modifications, variations or equivalents. It is intended that the following claims define the scope of the invention and that methods and structures within the scope of these claims and their equivalents be covered thereby.

What is claimed is:

1. A method of classifying an infrared image into training data to be used for training a machine learning model for detecting a target object in infrared images, the method comprising:

(i) providing a set of machine learning models, each machine learning model being associated with a respective range of a difference obtained by subtracting an average pixel value of pixels corresponding to a target object from an average pixel value of pixels corresponding to a comparison object;

(ii) acquiring an infrared image;

(iii) identifying, in the infrared image, pixels corresponding to the target object and pixels corresponding to the comparison object;

(iv) calculating a first average pixel value of the pixels corresponding to the target object and a second average pixel value of the pixels corresponding to the comparison object;

(v) calculating the difference by subtracting the first average pixel value from the second average pixel value; and (vi) selecting, from the set of machine learning models, one machine learning model associated with the respective range including the difference, and classifying the infrared image into training data to be used to train the selected machine learning model.

2. The method of claim 1, wherein the target object is a pedestrian, and the comparison object is a road surface.

3. The method of claim 1, wherein said identifying, in the infrared image, the pixels corresponding to the target object and the pixels corresponding to the comparison object comprises using a semantic segmentation model.

4. The method of claim 1, wherein identifying, in the infrared image, the pixels corresponding to the target object and the pixels corresponding to the comparison object comprises generating a semantic segmentation image taken in the same field of view as the acquired infrared image, and identifying, in the infrared image, the pixels corresponding to the target object and the pixels corresponding to the comparison object based on the semantic segmentation image.

5. The method of claim 1, wherein the difference indicates a temperature relationship between the target object and the comparison object.

6. The method of claim 5, wherein the temperature relationship indicates whether the second average pixel value is greater than or smaller than the first average pixel value.

7. The method of claim 1, wherein the set of machine learning models comprise:

a hot-weather model associated with a respective range in which the second average pixel value is greater than the first average pixel value; and a cold-weather model associated with a respective range in which the second average pixel value is smaller than the first average pixel value.

8. A method executed by a processor for detecting a target object in an infrared image for image recognition, (a) providing a set of machine-learned models trained using training data classified by a method, the method comprising:

(a1) providing a set of machine learning models in function of temperature;

(a2) acquiring a training infrared image;

(a3) identifying a target object to be detected and a comparison object in the training infrared image;

(a4) calculating a first characteristic of the target object in the training infrared image and a second characteristic of the comparison object in the training infrared image; and (a5) based on the first characteristic of the target object and the second characteristic of the comparison object, selecting a machine learning model among the set of machine learning models in function of temperature for the training infrared image; and (b) acquiring an infrared image;

(c) acquiring an outside temperature related to the infrared image;

(d) based on the outside temperature, selecting a machine-learned model among the set of machine-learned models;

(e) using the selected model to identify whether the infrared image includes a target object and a comparison object;

(f) if either one or both of a target object and a comparison object is not identified in the infrared image, repeating the steps (b) to (e);

(g) if a target object and a comparison object are both identified in the infrared image, calculating the first characteristic of the target object in the infrared image and the second characteristic of the comparison object in the infrared image;

(h) based on the first characteristic of the target object and the second characteristic of the comparison object, selecting a machine learning model among the set of machine learning models in function of temperature;

(i) if the acquired outside temperature is within the temperature range of the selected machine learning model, determining the selected machine learning model as the model to be used;

(j) if the acquired outside temperature is not within a temperature range of the selected machine learning model, selecting another machine learning model that corresponds to the acquired outside temperature, and determining the selected another machine learning model as the model to be used; and (k) using the determined model to be used for the image recognition of the target object.

9. An onboard vehicle computer unit for detecting a target object in an IR image, the unit comprising:

a processor;

a storage in which machine readable program codes are stored, that, when executed by the processor, cause the processor to perform the method of claim 8.

10. A non-transitory computer readable storage medium comprising program codes for detecting a target object in an IR image, the program codes that, when executed by a processor, cause the processor to perform the method of claim 8.

11. A vehicle having an IR camera, an outside temperature sensor, and the onboard vehicle computer unit according to claim 9.

12. A vehicle having an IR camera, an outside temperature sensor, and the non-transitory computer readable storage medium according to claim 10.

* * * * *